Patented July 10, 1951

2,559,596

UNITED STATES PATENT OFFICE 2,559,596

HALOMETHYL DERIVATIVES OF ACEDIAN-THRONES AND METHOD OF PREPARING THE SAME

Samuel Coffey, David Alexander Whyte Fairweather, Frank Lodge, and James Wardleworth, Blackley, Manchester, England, assignors to Imperial Chemical Industries Limited, a corporation of Great Britain No Drawing. Application May 13, 1947, Serial No. 747,834. In Great Britain May 20, 1946

9 Claims. (Cl. 260—351)

This invention relates to new dyestuff intermediates and more particularly it relates to the manufacture of new dyestuff intermediates derived from acedianthrone.

By acedianthrone we mean the compound of the formula

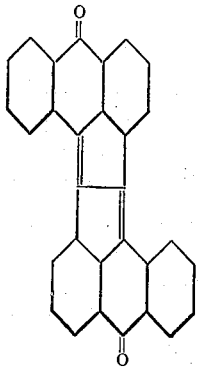

which may for example be obtained by treating $a:\beta$-bis-(9:9'-dianthronylidene)-ethane with acetic anhydride and sulphuric acid in nitrobenzene as described in British Patent No. 551,622.

According to the invention we manufacture new dyestuff intermediates by treating acedianthrone, or simple derivatives of acedianthrone, with bromo- or chloro-methylating agents in the presence of suitable condensing agents.

Simple derivatives of acedianthrone which may be used include acedianthrones which carry one or more chloro, bromo, amino, alkoxy or alkyl substituents.

By bromo- or chloro-methylating agents we mean agents known to be capable of replacing the reactive hydrogen atoms of aromatic nuclei by bromomethyl or chloromethyl groups. As such agents there may be mentioned dichlorodimethylether and dibromodimethylether or substances which can give rise to dichloro and dibromodimethylether in the reaction mixture, for example paraformaldehyde and hydrogen chloride.

As suitable condensing agent there may be mentioned sulphuric acid. Alternatively aluminium chloride may be used as a condensing agent preferably in the presence of a tertiary base such as for example pyridine. When aluminum chloride is used as condensing agent it is sometimes unnecessary to add hydrogen chloride when the chloromethylation is done with paraformaldehyde.

The products of the invention are acedianthrones which carry one or more bromo- or chloromethyl groups according to the conditions of the reaction. They may be isolated by pouring the reaction mixture into a mixture of ice and water and filtering off the solid which separates.

The invention is illustrated but not limited by the following examples in which the parts are by weight:

Example 1

50 parts acedianthrone are added to 750 parts concentrated sulphuric acid at 15–20° C. in 20 minutes and the mixture is stirred for 30 minutes. 75 parts dichlorodimethylether are then added and the mixture is heated to 50° C. in 1 hour and stirred at this temperature for 16 hours. The reaction mixture is then cooled and poured into a mixture of ice and water and the precipitated bis-(chloromethyl)-acedianthrone is filtered off, washed with water and dried. The product is a brown powder insoluble in water. It dissolves in concentrated sulphuric acid to give a violet coloured solution and in nitrobenzene to give a reddish-brown solution.

Example 2

30 parts aluminum chloride are added to 10 parts of pyridine. The temperature of the mixture rises to 120–130° C. The mixture is then cooled to 60° C. and 6.5 parts of dichlorodimethylether are added. 5 parts of acedianthrone are then added and the mixture is stirred at 60° C. for 3 hours. The reaction mixture is poured into a mixture of ice and water and the bis-(chloromethyl)-acedianthrone is filtered off, washed with water and dried. The product is similar to that obtained in Example 1.

Example 3

5 parts of acedianthrone are added to 60 parts of concentrated sulphuric acid at 15–20° C. and the mixture is stirred for 30 minutes. 22 parts of dibromodimethylether are then added and the mixture is heated to 60° C. in 1 hour and stirred at this temperature for 16 hours. The reaction mixture is cooled and poured into a mixture of ice and water and the bis-(bromomethyl)-acedianthrone is filtered off, washed and dried. The product is a brown powder, which is insoluble in water. It gives a violet solution in concentrated sulphuric acid and a reddish-brown solution in nitrobenzene.

Example 4

50 parts of $\beta:\beta'$-dichloroacedianthrone (obtained from $\beta$-chloroanthrone by condensation with glyoxal sulphate and ring closure of the product by the method of British Patent No. 551,622) are dissolved in 750 parts of concentrated sulphuric acid at 15–20° C. during 1 hour. 70 parts of dichlorodimethylether are then added and the temperature is raised to 50° C. in 1 hour, and maintained at 50–55° C. for 16 hours. The product is isolated by pouring the reaction mixture into a mixture of ice and water, filtering, washing with water and drying, to give a dark-brown powder, soluble in concentrated sulphuric acid with a blue-violet colour.

*Example 5*

50 parts of β:β'-dibromoacedianthrone (prepared by condensing β-bromoanthrone with glyoxal sulphate and cyclisation of the product according to the method of British Patent No. 551,622) are dissolved in 900 parts of concentrated sulphuric acid at 15–20° C. during 1 hour. 65 parts of dichlorodimethylether are then added. The mixture is heated to 50° C. in 1 hour and stirred at 50–55° C. for 18 hours. The product is isolated as described in Example 1 to give a dark brown powder.

*Example 6*

2 parts of β:β'-dimethylacedianthrone (from 2-methylanthrone and glyoxal sulphate followed by cyclisation) are dissolved in 55 parts of cold concentrated sulphuric acid. 3.5 parts of dichlorodimethylether are added. The temperature is raised to 50–55° C. and the mixture is stirred for 20 hours. The product is isolated as described in Example 1 to give a dark-brown powder, which is insoluble in water.

*Example 7*

20 parts of acedianthrone are dissolved in 240 parts of 100% sulphuric acid with stirring at 15–20° C. 8 parts of dichlorodimethylether are added and the temperature is raised to 60° C. in 1 hour. The mixture is stirred at 60° C. for 18 hours. The product is isolated by pouring the reaction mixture into 1200 parts of a mixture of ice and water, filtering and washing the residue thoroughly with cold water. The residue is dried at 40–50° C. when monochloromethyl acedianthrone is obtained as a dark brown powder.

We claim:
1. New compounds of the formula:

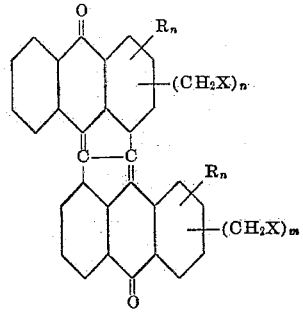

wherein: (a) R is a radical selected from the group consisting of chloro, bromo, amino and methyl; (b) X is a radical selected from the group consisting of chloro and bromo; (c) $m$ is a positive integer; and (d) $n$ is an integer from the group consisting of zero and positive integers.

2. The new compounds: Bis-(chloromethyl)-acedianthrone.

3. The new compounds: Bis-(chloromethyl)-2:2'-dichloroacedianthrone.

4. The new compounds: Bis-(chloromethyl)-2:2'-dimethylacedianthrone.

5. A process for the manufacture of new dyestuff intermediates which comprises treating in the presence of a condensing agent acedianthrone and derivatives thereof with a methylating agent capable of replacing the reactive hydrogen atoms of aromatic nuclei with a group selected from the halomethyl group consisting of bromomethyl and chloromethyl.

6. A process as set forth in claim 5 wherein the methylating agent is dichlorodimethyl ether.

7. A process as set forth in claim 5 wherein the methylating agent is dibromodimethyl ether.

8. A process as set forth in claim 5 wherein the methylating agent is paraformaldehyde and hydrogen chloride.

9. A process as set forth in claim 5 wherein the condensing agent is sulphuric acid.

SAMUEL COFFEY.
DAVID ALEXANDER
 WHYTE FAIRWEATHER.
FRANK LODGE.
JAMES WARDLEWORTH.

REFERENCES CITED

The following references are of record in the file of this patent:

UNITED STATES PATENTS

| Number | Name | Date |
|---|---|---|
| 1,990,841 | Scheyer | Feb. 12, 1935 |
| 2,385,185 | Batty et al. | Sept. 18, 1945 |

FOREIGN PATENTS

| Number | Country | Date |
|---|---|---|
| 551,622 | Great Britain | Mar. 3, 1943 |

OTHER REFERENCES

Isler: "J. prakt. Chem.," (2), vol. 80 (1909), pages 287 and 288.

Fieser et al.: "Organic Chemistry," (1944), pages 656 to 660.